US011928584B2

(12) United States Patent
Powley et al.

(10) Patent No.: US 11,928,584 B2
(45) Date of Patent: Mar. 12, 2024

(54) DISTRIBUTED HYPERPARAMETER TUNING AND LOAD BALANCING FOR MATHEMATICAL MODELS

(71) Applicant: salesforce.com, inc., San Francisco, CA (US)

(72) Inventors: Bradford William Powley, Palo Alto, CA (US); Noah Burbank, Palo Alto, CA (US); Rowan Cassius, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 999 days.

(21) Appl. No.: 16/778,587

(22) Filed: Jan. 31, 2020

(65) Prior Publication Data
US 2021/0241164 A1    Aug. 5, 2021

(51) Int. Cl.
*G06N 3/08*       (2023.01)
*H04L 67/1001*    (2022.01)

(52) U.S. Cl.
CPC .......... *G06N 3/08* (2013.01); *H04L 67/1001* (2022.05)

(58) Field of Classification Search
CPC .. G06N 3/08; G06N 5/01; G06N 7/01; G06N 3/082; G06N 20/00; H04L 67/1001
See application file for complete search history.

(56) References Cited

U.S. PATENT DOCUMENTS

| 2018/0240041 A1* | 8/2018 | Koch | G06N 20/10 |
| 2020/0311572 A1* | 10/2020 | Baker | G06N 3/084 |
| 2020/0387565 A1* | 12/2020 | Caglar | G06F 17/18 |

(Continued)

FOREIGN PATENT DOCUMENTS

WO    WO-2021000244 A1 *    1/2021    ............. G06N 3/082

OTHER PUBLICATIONS

Jia Wu et al: "Hyperparameter Optimization for Machine Learning Models Based on Bayesian Optimizationn", School of Information and Software Engineering, University of Electronic Science and Technology of China, Mar. 1, 2019 Chengdu 610054, China, vol. 17, Issue 1, Mar. 2019, pp. 26-40, (year:2019) (Year: 2019).*

(Continued)

*Primary Examiner* — Michael J Huntley
*Assistant Examiner* — Imad Kassim
(74) *Attorney, Agent, or Firm* — Holland & Hart LLP

(57) ABSTRACT

Methods, systems, and devices for distributed hyperparameter tuning and load balancing are described. A device (e.g., an application server) may generate a first set of combinations of hyperparameter values associated with training a mathematical model. The mathematical model may include a machine learning model, an optimization model, or any combination. The device may identify a subset of combinations from the first set of combinations that are associated with a computational runtime that exceeds a first threshold and may distribute the subset of combinations across a set of machines. The device may then test each of the first set of combinations in a parallel processing operation to generate a first set of validation error values and may test a second set of combinations of hyperparameter values using an objective function that is based on the first set of validation error values.

20 Claims, 10 Drawing Sheets

(56) References Cited

U.S. PATENT DOCUMENTS

2021/0097343 A1* 4/2021 Goodsitt ............ G06F 18/2415

OTHER PUBLICATIONS

Yaliang, WO 2021000244 A1 downloaded version for paragraphs and pages referencing (Year: 2019).*
Diaz et al. ("An effective algorithm for hyperparameter optimization of neural networks", arXiv: 1705.08520, May 23, 2017) (Year: 2017).*
Lorenzo et al ("Hyper-Parameter Selection in Deep Neural Networks Using Parallel Particle Swarm Optimization", GECCO '17 Companion, Berlin, Germany) (Year: 2017).*
Ali et al ("A Parallel Grid Optimization of SVM Hyperparameter for Big Data Classification using Spark Radoop Classification using Spark Radoop", vol. 6 : Iss. 1 , Article 3, 2020) (Year: 2020).*

* cited by examiner

DISTRIBUTED HYPERPARAMETER TUNING AND LOAD BALANCING FOR MATHEMATICAL MODELS

FIELD OF TECHNOLOGY

The present disclosure relates generally to database systems and data processing, and more specifically to distributed hyperparameter tuning and load balancing for mathematical models.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Mathematical models (such as machine learning models) may include model parameters and model hyperparameters. A mathematical model (such as a machine learning model) generally learns the model parameters. A model parameter may be a configuration variable that is internal to the mathematical model, and a specification and an optimization process of a model hyperparameter may be external to a dataset the mathematical model is trained on. The model parameter may be estimated or learned from data associated with the machine learning model and a value of the model hyperparameter may be set before beginning training of the mathematical model. In some instances, a value of the model hyperparameter cannot be estimated from the data used in the mathematical model. Conventional methods for training individual mathematical models using model hyperparameters can be computationally and temporally expensive. Specifically, current techniques lack the ability to optimize a training of a mathematical model.

DETAILED DESCRIPTION

Figure 1:
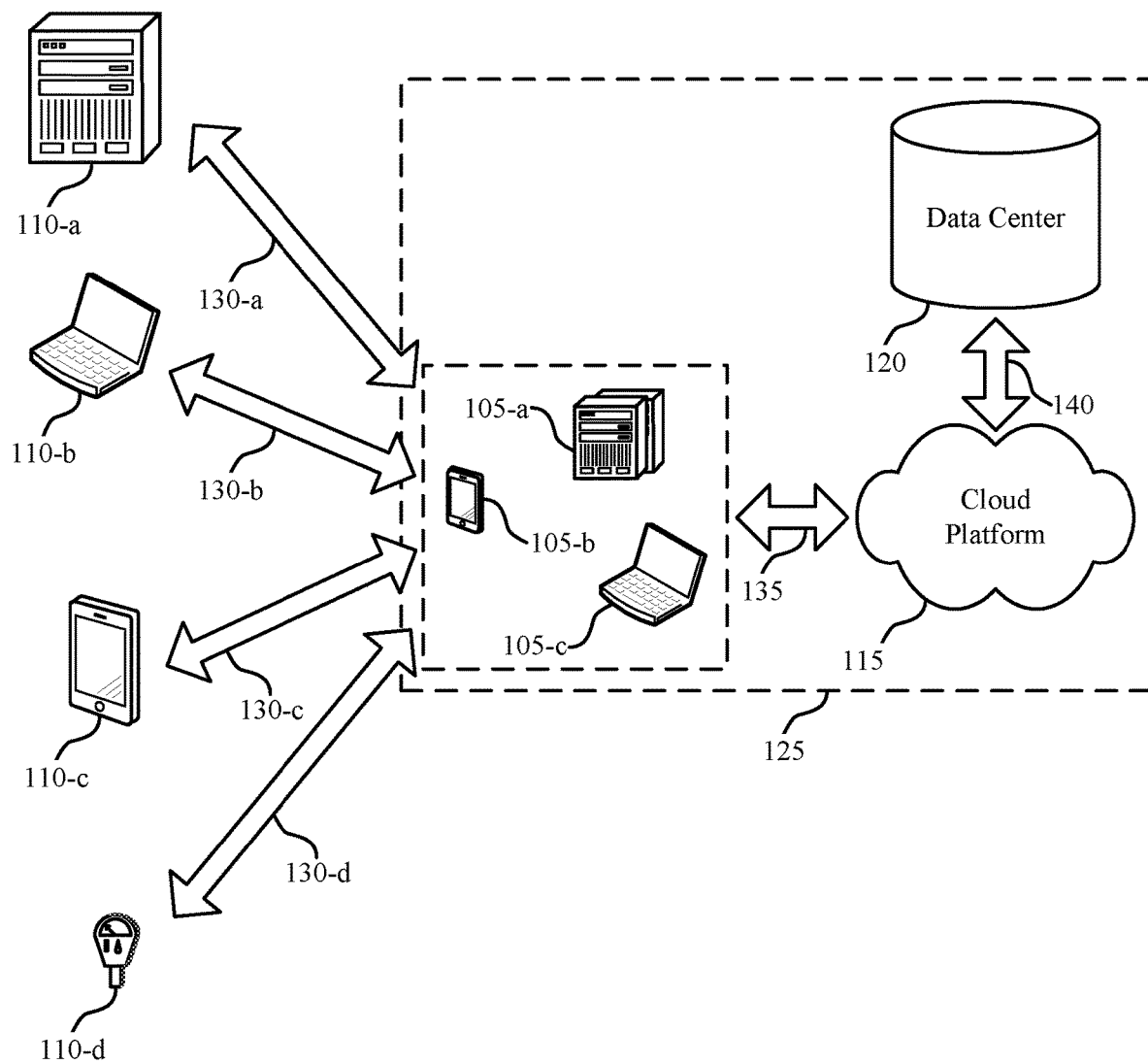
FIG. 1 illustrates an example of a system for data processing that supports distributed hyperparameter tuning and load balancing for mathematical models in accordance with aspects of the present disclosure.

Some systems (e.g., artificial intelligence systems supporting customer relationship management (CRM) and one or more datasets) may support a user-friendly, interactive data analytics application. Such an application may receive a request to run one or more mathematical models (or machine learning models) on different data sets. In some examples, the data sets associated with the one or more mathematical models may include a dataset of one (e.g., a single datum). As one example, a user may input a request to run or develop a mathematical model into a data analytics application running on a user device. In some cases, the data analytics application on the user device may transmit the request to a server (such as an application server). Developing a mathematical model (or machine learning model) may include training the mathematical model. Conventional methods for training machine leaning models may be computationally expensive and enhanced training methods may be desired.

In some implementations, machine learning models may include model parameters and model hyperparameters. Model parameters are parameters that the model learns itself and model hyperparameters are parameters that are unlearnable from data associated with the machine learning models. In some instances, a model parameter may be described as a configuration variable that is internal to a machine learning model (or any other model) and the value of the model parameter can be estimated from the data associated with the machine learning model. In some examples, a model parameter may be estimated or learned from the data. Such model parameters may also be based on historical training data. On the other hand, model hyperparameters may be a configuration that is external to the model and the value of a model hyperparameter cannot be estimated from data associated with the machine learning model. That is, a model hyperparameter may be described as a parameter whose value is set before training begins. In some examples, model hyperparameters may be set using one or more heuristics and are often tuned for a given modeling problem. In some examples, hyperparameter tuning may be used to create a machine learning model. As described herein, model hyperparameters are not learnable from the data, and a data scientist may have to set the model hyperparameters. In one example of building a deep neural network, the model hyperparameters may include a number of layers included in the deep neural network, a number of cells included in the deep neural network, or any combination.

In some systems, hyperparameter tuning for machine learning may include training. In some examples, a machine learning model may be trained in order to have the machine learning model learn its parameters. In some cases, a data scientist may build a table (or a grid) listing a set of possible combinations of various hyperparameter values, and a model may be trained separately for each hyperparameter combination. In some cases, the set of possible combinations may include all the possible combinations. In some examples, instead of building a grid, the data scientist (or a device) may identify one or more sample points to test from a hyperparameter space. That is, one or more random samples from a hyperparameter grid may be randomly identified and used to train a model. Additionally or alternatively, one or more random samples may not randomly be identified from a hyperparameter grid. In some examples, the data scientist may list a set of model hyperparameters from a preselected grid including all possible combinations of the preselected model hyperparameters, and may then train a model (such as a machine learning model or an artificial intelligence model) once each time for each combination of model hyperparameters. For example, the method described herein may include generating a first set of combinations of hyperparameter values associated with training a machine learning model. According to one or more aspects, the individual model training runs may be performed in parallel on separate machines. For example, if there are three chosen values for each of the three model hyperparameters, then the grid may include twenty seven combinations of model hyperparameter values.

In some aspects, a total run time for the parallel process is as long as the longest individual training run. Thus, it may be necessary to optimize the computational runtime for the parallel process (i.e., running the various combinations of the model hyperparameter values in parallel). After the parallel computing process, the results from each run are analyzed using a serial function (e.g., a Bayesian search algorithm) to find the result yielding the best performance. However, both the serial process and the parallel process can be computationally and temporally expensive if not optimized.

One or more aspects of the present disclosure may provide for techniques to optimize the load balancing of the parallel computing process to reduce the compute time for the parallel process, while providing a sufficient number of seed data points for the serial process so that the serial process is also optimized. For example, the hyperparameter values that contribute most significantly to the computational cost are identified and evenly distributed among the different machines, whereas the remaining hyperparameters can be randomly distributed. In some cases, the method described herein may identify a subset of combinations from the first set of combinations of hyperparameter values. The subset of combinations may be associated with a computational runtime that exceeds a first threshold. In one example, the method may determine that a model hyperparameter value in the first set of combinations is associated with the computational runtime that exceeds the first threshold. The method may then identify the subset of combinations based on determining the model hyperparameter value. In some examples, the method described herein may distribute the subset of combinations across a set of machines such that each machine of the set of machines is assigned a number of the subset of combinations that is less than a second threshold. That is, the method may distribute the subset across one or more machines such that the subsets are not concentrated in one machine. By performing this load balancing technique ahead of time, the timing of the parallel process can be minimized for a given number of machines, which can reduce the cost of performing the parallel process.

After completion of the optimized parallel process, the present disclosure provides for a serial process (e.g., a Bayesian search) to identify a low error point (such as a result having a loss less than a threshold, a result having a least error) in the hybrid parallel space (i.e., the result space from the parallel process as well as the serial process). In some aspects, the method described herein may test each of the first set of combinations against the machine learning model using the set of machines in a parallel processing operation to generate a first set of validation error values. That is, testing each combination of model hyperparameter values described herein may result in one or more loss values or error values. One or more aspects of the present disclosure may provide for using the result from the parallel process as seed data points for the serial process. In one example, all data points from the result of the parallel process may be inputted into the serial process. Alternatively, a subset of the data points from the result of the parallel process may be inputted into the serial process. According to one or more aspects of the present disclosure, the optimized parallel process and the serial process may be performed in a loop, where a result from the serial process may be used to generate one or more results from a second optimized parallel process. The one or more results generated from the second optimized parallel process may in turn be inputted into a second serial process.

In some cases, the method described herein may test a second set of combinations of hyperparameter values against the machine learning model using an objective function that is based on the first set of validation error values. In one example, the method may run the objective function on a single machine using a serial processing operation. In some examples, the objective function may be run using a combination of a driver node (or machine) and one or more worker nodes (or machines). For instance, an optimization may be performed on each of the worker machines, and the worker may only submit a result from each worker machine back to the driver machine. In this example, the objective function may be performed partially in parallel and partially in series. In one example, the worker machines may shuffle information amongst themselves and return the highest value. In such cases, the cost of shuffling information within the worker machine(s) may be higher than choosing a result and submitting the result to the driver machine. Prior to running the second set of combinations of hyperparameter values against the machine learning model, the present disclosure may provide for generating the second set of combinations of hyperparameter values against the machine learning model using the objective function. The method described herein may then identify a set of validation error values generated in response to the serial process. For instance, the method may identify a validation error value or loss value associated with testing each combination of model hyperparameter values using the serial process. The method described herein may then identify, based on testing the second set of combinations of hyperparameter values, a combination of model hyperparameter values having a validation error value less than a threshold. Thus, the optimized parallel process in turn contributes to the optimization of the serial process by providing more seed data points for the serial process for a given compute time, which can reduce the overall compute time for the serial process.

Aspects of the disclosure are initially described in the context of an environment supporting an on-demand database service. Additional aspects are described with reference to model hyperparameter tuning procedures, and a system that supports model hyperparameter tuning. Aspects of the disclosure are further illustrated by and described with reference to apparatus diagrams, system diagrams, and flowcharts that relate to distributed hyperparameter tuning and load balancing for machine learning models.

FIG. 1 illustrates an example of a system 100 for cloud computing that supports distributed hyperparameter tuning and load balancing for mathematical models in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

A device (e.g., any component of subsystem 125, such as a cloud client 105, a server or server cluster associated with the cloud platform 115 or data center 120, etc.) may perform any combination of the following techniques and procedures to provide for distributed hyperparameter tuning for mathematical models (e.g., machine learning models, artificial intelligence models, optimization models, models for non-convex minimization, etc.). For example, the device (e.g., a user device, server, server cluster, database, etc.) may generate a first set of combinations of hyperparameter values associated with training a mathematical model. As described herein, the hyperparameter values may be associated with hyperparameters which may include one or more unlearnable parameters in a mathematical model. In some examples, the device may identify a subset of combinations from the first set of combinations that are associated with a computational runtime that exceeds a first threshold. For instance, the device may determine that one or more hyperparameter values are associated with a hyperparameter, where the one or more hyperparameter values are associated with a high computational runtime. In this case, the device may refrain from including more than a predetermined number of computationally expensive hyperparameter values in a combination of hyperparameter values.

According to one or more aspects, the device may distribute the subset of combinations across a set of machines such that each machine of the set of machines is assigned a number of the subset of combinations that is less than a second threshold. That is, the device may distribute the subset of combinations of hyperparameters across one or more machines such that the subsets of combinations of hyperparameters are not concentrated in one machine. After performing the load balancing process, the device may test each of the first set of combinations against the mathematical model using the set of machines in a parallel processing operation. Thus, by performing this load balancing technique ahead of time, the timing of the parallel process can be minimized for a given number of machines, which can reduce the cost of performing the parallel process. The device may generate a first set of validation error values in response to the parallel processing operation. In some examples, the device may then test a second set of combinations of hyperparameter values against the mathematical model using an objective function that is based on the first set of validation error values.

In conventional systems, mathematical models (such as machine learning models) may include parameters that the model learns itself, and parameters that are unlearnable, which are referred to as hyperparameters. Typically, in order to train a mathematical model, a data scientist may build a table listing a set of possible combinations of the various hyperparameter values. The mathematical model may then be trained separately for each hyperparameter combination. The individual model training runs may be performed in parallel on separate machines (or virtual machines, bare metal machines, a set of threads on a single multi-thread processor, etc.), and the total run time for the parallel processing operation is as long as the longest individual training run. In some cases, the results from each run are analyzed using a serial processing operation after the parallel processing operation. However, both the serial process and the parallel process can be computationally and temporally expensive. Thus, there exists a need for optimizing the parallel processing operation and the serial processing operation.

In contrast to the existing systems, the system 100 may provide for techniques for optimizing the load balancing of the parallel processing operation to reduce the compute time for the parallel processing operation. Moreover, distributed hyperparameter tuning in the parallel processing operation may provide a sufficient number of seed data points for the serial processing operation so that the serial processing operation is also optimized. For example, the hyperparameter values that contribute most significantly to the computational cost are identified and evenly distributed among the different machines, whereas the remaining hyperparameters can be randomly distributed. By performing this load balancing technique ahead of time, the timing of the parallel process can be minimized for a given number of machines, which can reduce the cost of performing the parallel processing operation. The optimized parallel processing operation in turn contributes to the optimization of the serial processing operation by providing more seed data points for the serial processing operation for a given compute time, which can reduce the overall compute time for the serial processing operation. In some examples, the optimized parallel process and the serial process may be performed in a loop, where a result from the serial process may be used to generate one or more results from a second optimized parallel process. The one or more results may be inputted into a second serial process, which may in turn generate a second result.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
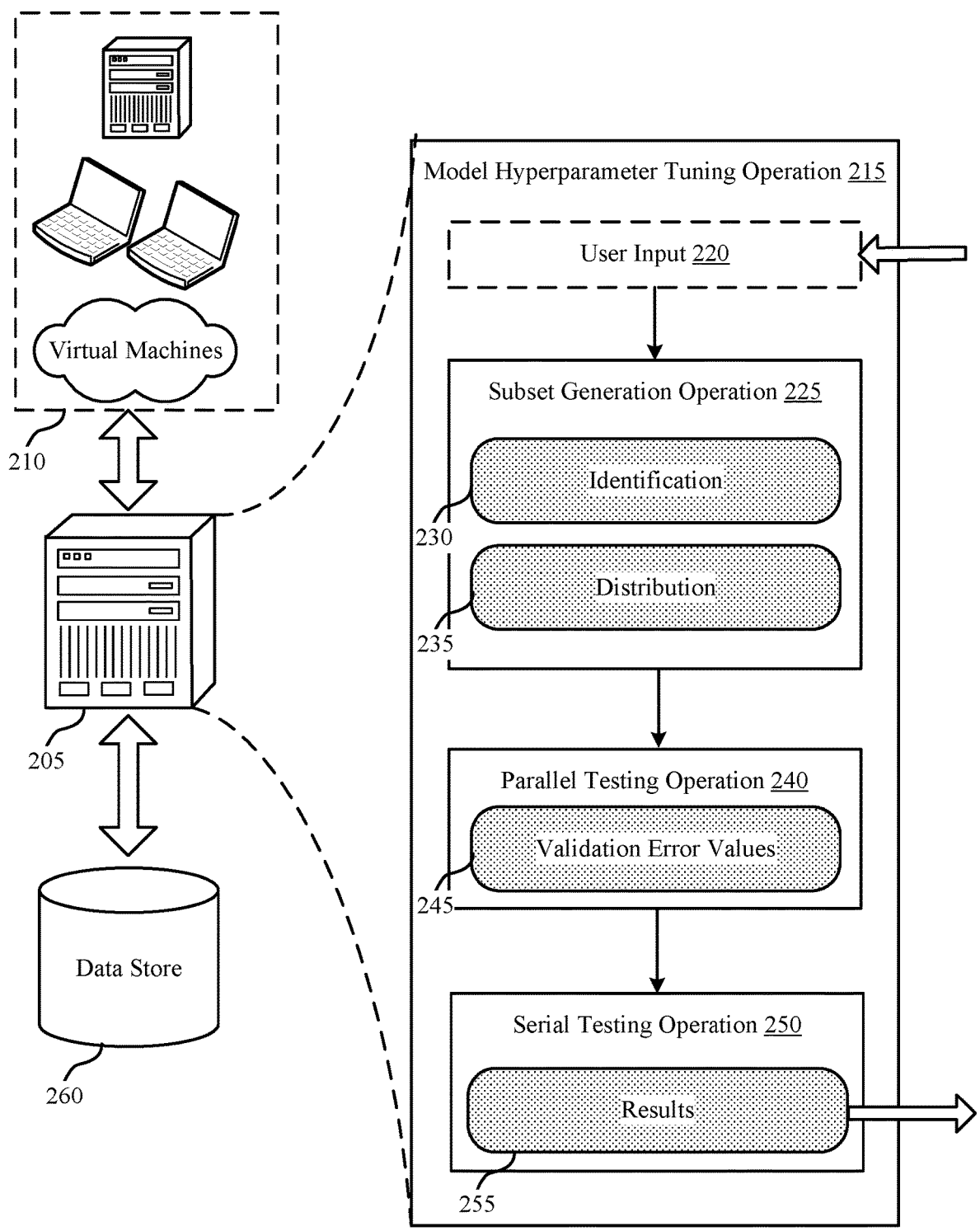
FIG. 2 illustrates an example of a system that supports distributed hyperparameter tuning and load balancing for mathematical models in accordance with aspects of the present disclosure.

FIG. 2 illustrates an example of a system 200 that supports distributed hyperparameter tuning and load balancing for mathematical models in accordance with aspects of the present disclosure. The system 200 may include a device 205 (e.g., an application server), a cluster 210 of machines, and a data store 260. In some cases, the functions performed by the device 205 (such as application server) may instead be performed by a component of the cluster 210 of machines, or the data store 260. A user device (not shown) may support an application for data analytics using machine learning models or other models. Specifically, a user device in combination with the device 205 may support an application that provides distributed hyperparameter tuning and load balancing for machine learning models. A user operating the user device may interact with the application to train a mathematical model (e.g., artificial intelligence model) at the device 205, where the device 205 may identify results 255 including combinations of model hyperparameters for training the mathematical model. In some examples, the device 205 may provide the results 255 to a user device (not shown).

According to one or more aspects of the present disclosure, a user device may display an interactive interface for receiving a request (from a user) to run a mathematical model (e.g., machine learning model). In some examples, the user device may display the interactive interface for receiving a request (from a user) to train or develop a mathematical model. Alternatively, the device 205 may train or develop a mathematical model (e.g., artificial intelligence model, a machine learning model, a non-convex optimization model) without receiving a request from a user device. In some cases, the interface at the user device may run as a webpage within a web browser (e.g., as a software as a service (SaaS) product). In other cases, the interface may be part of an application downloaded onto the user device. A user operating the user device may input information into the user interface to specify aspects of the request to develop a mathematical model. In some cases, a user may be associated with a user credential or user identifier (ID), and the user may log on to the user device using the user credential. In certain aspects, the device 205 (or application server) may not have the requested mathematical model developed at the device 205. Additionally or alternatively, the device 205 may determine a need to develop a mathematical model (e.g., machine learning model), and the device 205 may perform distributed hyperparameter tuning for training the mathematical model. As described herein, the device 205 in conjunction with the cluster 210 of machines, and the data store 260 may perform a model hyperparameter tuning operation 215.

According to one or more aspects of the present disclosure, the model hyperparameter tuning operation 215 may be performed by the device 205, such as a server (e.g., an application server, a database server, a server cluster, a virtual machine, a container, etc.). Although not shown in FIG. 2, the model hyperparameter tuning operation 215 may be performed by a user device, a data store, or some combination of these or similar devices. In some cases, the device 205 may be a component of a subsystem 125 as described with reference to FIG. 1. The device 205 may optionally receive an user input 220 and may perform subset generation 225 to identify and distribute subsets. For example, using a number of techniques, the device 205 may train a mathematical model and may tune one or more model hyperparameters while used to train the mathematical model. In some aspects, the device 205 may perform a parallel testing operation 240 and a serial testing operation 250 to determine the results 255. In some examples, the parallel testing operation 240 and the serial testing operation 250 may be performed in a loop. In some examples, the device 205 may provide the results 255 to a user. In other aspects, the device 205 may store the results 255 in the data store 260. In some cases, a device 205 may implement all of the techniques described herein to perform an optimized parallel process (such as parallel testing operation 240), which in turn contributes to the optimization of a serial process (such as serial testing operation 250) by providing more seed data points for the serial process for a given compute time. In other cases, the device 205 may implement a subset of the described techniques or may implement additional techniques to support generation of the results 255. Thus, the described techniques can reduce the overall computation time for the serial process by using input from an optimized parallel process.

The device 205 may support computer aided data science, which may be performed by an artificial intelligence-enhanced data analytics framework. The device 205 may be an example of a general analysis machine and, as such, may perform data analytics and mathematical model development based on receiving a request from a user. In some examples, the device 205 may perform data analytics and mathematical model development without receiving a request from a user. In a first example, the device 205 may run an application for mathematical model development (e.g., in a webpage of a web browser). In a second example, the device 205 may perform backend processing for mathematical model development (or machine learning model training and development). According to one or more aspects, the artificial intelligence-enhanced model training and development may support user interaction via a user interface. In some cases, a user may guide or provide inputs for a model training and development procedure, and the device 205 may perform the training and determine hyperparameter values having a low compute time and a low error.

As described herein, mathematical models (e.g., machine learning models) may include model parameters and model hyperparameters. Model parameters are parameters that the model learns itself and model hyperparameters are parameters that are not learnt by the mathematical model. In some instances, a model hyperparameter (or hyperparameter) may be a configuration that is external to the mathematical model and the value of a hyperparameter cannot be estimated from data associated with the mathematical model. That is, initiating a development of a mathematical model, the device 205 may determine one or more hyperparameter values associated with the mathematical model. In some aspects, the device 205 may determine one or more hyperparameters values prior to beginning of training of the mathematical model (or machine learning model). In some examples, the one or more hyperparameters may be set using one or more heuristics and are often tuned for a given modeling problem. In some examples, the device 205 may use hyperparameter tuning to create and train a mathematical model.

According to one or more aspects of the present disclosure, the device 205 may receive a request from a user device (such as a user device separate from device 205). In some cases, the request may include a request to train and develop a mathematical model. The user device (not shown) may receive the request from a user on an interactive interface. This interface may run as a webpage within a web browser, or the interface may be part of an application downloaded onto the user device. The request to develop and train a mathematical model may include information inputted by a user into a user interface. For example, the user may specify aspects of the request to train and develop a mathematical model.

In some example, upon receiving the request (or without receiving a request) the device 205 may identify one or more model hyperparameters. For instance, a data scientist may build a table listing a set of possible combinations of the various hyperparameter values, and the device 205 may identify the various hyperparameter values from the table. In one example, hyperparameter tuning for machine learning may include training. In some examples, a data scientist may list the model hyperparameters in a grid including all possible combinations of the model hyperparameters, and may then train a model (such as a machine learning model or a mathematical model) once each time for each combination of model hyperparameters.

According to one or more aspects, the device 205 may generate a first set of combinations of hyperparameter values associated with training a machine learning model. As one example, the device 205 may generate or otherwise identify hyperparameter values associated with three types of hyperparameters. For instance, the device may generate or otherwise identify a first hyperparameter as "number of lines," a second hyperparameter as "feature scale," and a third hyperparameter as "n-gram threshold." In this example, the hyperparameter values associated with the first hyperparameter "number of lines" may be 10, and 30, the hyperparameter values associated with the second hyperparameter "feature scale" may be true and false, and the hyperparameter values associated with the third hyperparameter "n-gram threshold" may be 10, 100, and 200. The device 205 may generate or otherwise identify eighteen combinations (3*2*3) of hyperparameter values associated with training the machine learning model. The device 205 may then use the identified or generated set of combinations of hyperparameter values to run an optimized parallel process and a serial process.

Upon generating the first set of combinations of hyperparameter values, the device 205 may perform the subset generation operation 225. For instance, the device 205 may identify a subset of combinations from the first set of combinations of hyperparameter values. The subset of combinations may be associated with a computational runtime that exceeds a first threshold. As described in the example of FIG. 2, a total run time for a parallel process is as long as the longest individual training run. Thus, it may be necessary to optimize the computational runtime for the parallel process (i.e., running the various combinations of the model hyperparameter values in parallel). In order to optimize the load balancing of the parallel computing process to reduce the compute time for the parallel process, the device 205 may distribute the combinations of hyperparameter values such that no one machine is assigned multiple combinations of hyperparameter values exceeding a threshold. Referring to the example where the hyperparameter values associated with the first hyperparameter "number of lines" is 10, 20, and 30, the hyperparameter values associated with the second hyperparameter "feature scale" is true and false, and the hyperparameter values associated with the third hyperparameter "n-gram threshold" is 10, 100, and 200, the device 205 may determine that the hyperparameter value of 30 associated with the first hyperparameter "number of lines" increases the computation time. Thus, the device 205 may determine that a threshold number of combinations of hyperparameter values including the hyperparameter value of 30 associated with the first hyperparameter "number of lines" may be assigned to a machine in the cluster 210.

In one example, the device 205 may identify (via identification 230) a subset of combinations from the first set of combinations that are associated with a computational runtime that exceeds a first threshold. For instance, the device 205 may identify one or more hyperparameter values associated with a hyperparameter, where the one or more hyperparameter values are associated with the computational runtime that exceeds the first threshold. In some examples, the first threshold may be based on a set of machines in the cluster 210. The device 205 tune the first threshold based on a number of the set of machines. In some cases, the device 205 may identify that the one or more hyperparameter values are associated with the computational runtime that exceeds the first threshold based on at least one of a subjective experience, an inference from previous runs, a known benchmark, or a combination thereof. In one example, the device 205 may be configured to select the first threshold (e.g., a computational threshold). The device 205 may then select the subset of combinations based on the selected first threshold. In some examples, a data scientist (or an individual associated with the identification 230) may train a mathematical model over a set of points in a hyperparameter space using a number of training samples. The data scientist may identify the one or more hyperparameters associated with a computational runtime that exceeds a first threshold based on training the mathematical model using the number of training samples.

The device 205 may further distribute (via distribution 235) the subset of combinations across a set of machines in cluster 210 such that each machine of the set of machines is assigned a number of the subset of combinations that is less than a second threshold. For example, the device 205 may distribute the hyperparameters such that each machine in the set of machines in the cluster 210 is assigned a number of hyperparameter value combinations satisfying the second threshold. As described herein, the set of machines in cluster 210 may include servers, virtual machines, bare metal machines, a set of threads on a single multi-thread processor or multiple multi-thread processors, or a combination thereof. In some examples, the device 205 may distribute a remaining subset of combinations of hyperparameter values from the first set of combinations of hyperparameter values across the set of machines based on a random distribution. For example, the hyperparameter values that contribute most significantly to the computational cost are identified and evenly distributed among the different machines, whereas the remaining hyperparameters can be randomly distributed. By performing this load balancing technique ahead of time, the timing of the parallel process can be minimized for a given number of machines, which can reduce the cost of performing the parallel process.

According to one or more aspects, the device 205 may perform a parallel process to determine a set of validation error values 245. For example, the device 205 may test each of the first set of combinations against the mathematical model using a set of machines in a parallel processing operation to generate a first set of validation error values 245. For instance, the device 205 may run multiple combinations of hyperparameters in parallel using machines in the cluster 210. After the parallel computing process, the results from each run are analyzed using a serial function (e.g., a Bayesian search algorithm) to find the result yielding the best performance.

One or more aspects of the present disclosure may provide for a serial testing operation 250 based on the validation error values 245 generated as a result of the parallel testing operation 240. For example, after completion of the parallel testing operation 240 (e.g., optimized parallel process), the device 205 may perform a serial testing operation 250 (e.g., a gradient descent, a Bayesian search, etc.) to identify a low point (such as a result having a loss less than a threshold, a result having the least loss, etc.) in the hybrid parallel space (i.e., the result space from the parallel testing operation 240 as well as the serial testing operation 250). The device 205 may test a second set of combinations of hyperparameter values against the mathematical model using an objective function that is based on the first set of validation error values. For example, the device 205 may run the objective function using a serial processing operation. In some cases, the device 205 may run the objective function on a single machine. For example, the device 205 may run the objective function using a combination of a driver node (or machine) and one or more worker nodes (or machines).

In one example, the driver node and the one or more worked nodes may be included in the cluster 210 of machines. In some cases, an optimization may be performed on each of the worker nodes, and the driver node may receive an optimized result from each of the worked nodes. The driver node may then determine an optimized result and may transmit the optimized result to the device 205. The device 205 may generate or otherwise identify a second set of combinations of hyperparameter values based on the objective function, and may test the second set of combinations of hyperparameter values against the mathematical model using the objective function. For example, the device 205 may determine that a mathematical model yielding an objective function value satisfying a threshold may indicate a combination of hyperparameters associated with the objective function. As described herein, the objective function may be that is based on the validation error values 245. In some examples, the device 205 may then generate results 255 of the serial testing operation 250 based on testing a second set of combinations of hyperparameter values. Thus, the hybrid of the optimized parallel process and the serial process provides for reduction in compute time, which can reduce the overall compute time for the training process.

Figure 3:
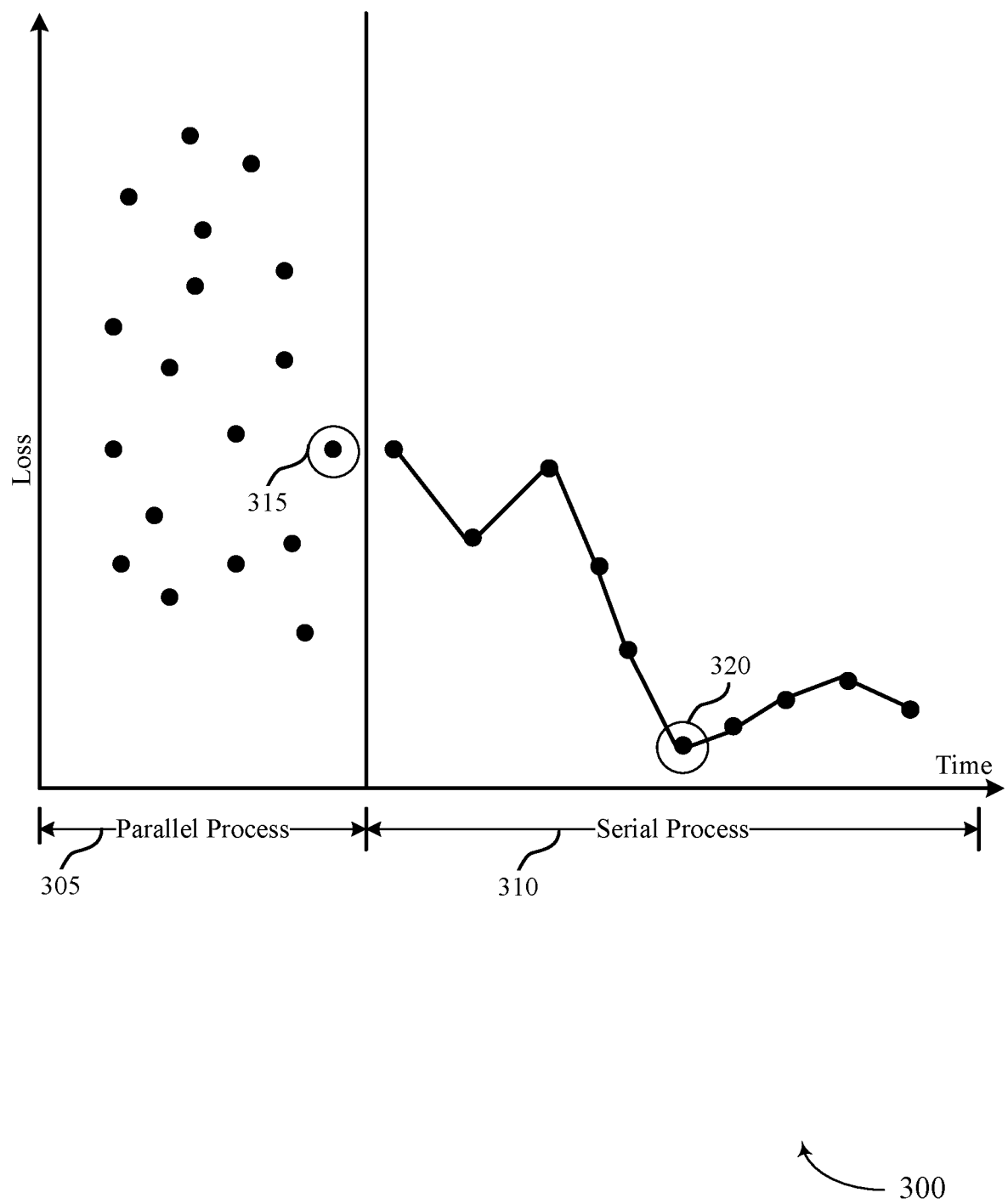
FIG. 3 illustrates an example of a graph that supports distributed hyperparameter tuning and load balancing for mathematical models in accordance with aspects of the present disclosure.

FIG. 3 illustrates an example of a graph 300 that supports distributed hyperparameter tuning and load balancing for mathematical models in accordance with aspects of the present disclosure. As depicted with reference to FIG. 3, the graph 300 may include a first portion including results from a parallel process 305 and a second portion including results from a serial process 310. As described with reference to FIGS. 1 and 2, a device (e.g., a user device, server, server cluster, database, etc.) may perform a parallel processing operation and a serial processing operation in order to efficiently train a mathematical model using various combinations of hyperparameter values. The device may first determine a set of possible combinations of the various hyperparameter values, and train the mathematical model separately for each hyperparameter combination. In some cases, the set of possible combinations of the various hyperparameter values may include all the possible combinations of the various hyperparameter values. The device may perform the parallel processing operation using a set of machines (such as servers, virtual machines, bare metal machines, etc.). After the parallel processing operation, the device may analyze the results from each run using a serial processing operation (e.g., a Bayesian search algorithm) to find the result yielding the best performance.

In some examples, the device may generate a first set of combinations of hyperparameter values associated with training a mathematical model. The device may then optimize the load balancing of the parallel processing operation to reduce the compute time for the parallel processing operation. For instance, the device may identify a subset of combinations from the first set of combinations that are associated with a computational runtime that exceeds a first threshold and distribute the subset of combinations across a set of machines such that each machine of the set of machines is assigned a number of the subset of combinations that is less than a second threshold. The device may then test each of the first set of combinations against the mathematical model using the set of machines in a parallel processing operation to generate a first set of validation error values. As described in the FIG. 3, the results included in the first portion associated with the parallel process 305 include the first set of validation error values. The device may identify one or more validation error values from the first set of validation error values to use as an input to the serial processing operation. In the example of FIG. 3, the device may use the validation error value 315 as an input to the serial processing operation. According to one or more aspects, the device may test a second set of combinations of hyperparameter values against the mathematical model using an objective function that is based on the first set of validation error values. In the example of FIG. 3, the objective function may be based on the validation error value 315. In some examples, the device may run the objective function using a serial processing operation. The device may then identify one or more results generated from running the objective function. For example, the device may identify a combination of hyperparameter values associated with a low loss and a low compute time. In the example of FIG. 3, the device may identify the result 320 as a combination of hyperparameter values optimized using both the parallel processing operation and the serial processing operation.

Figure 4:
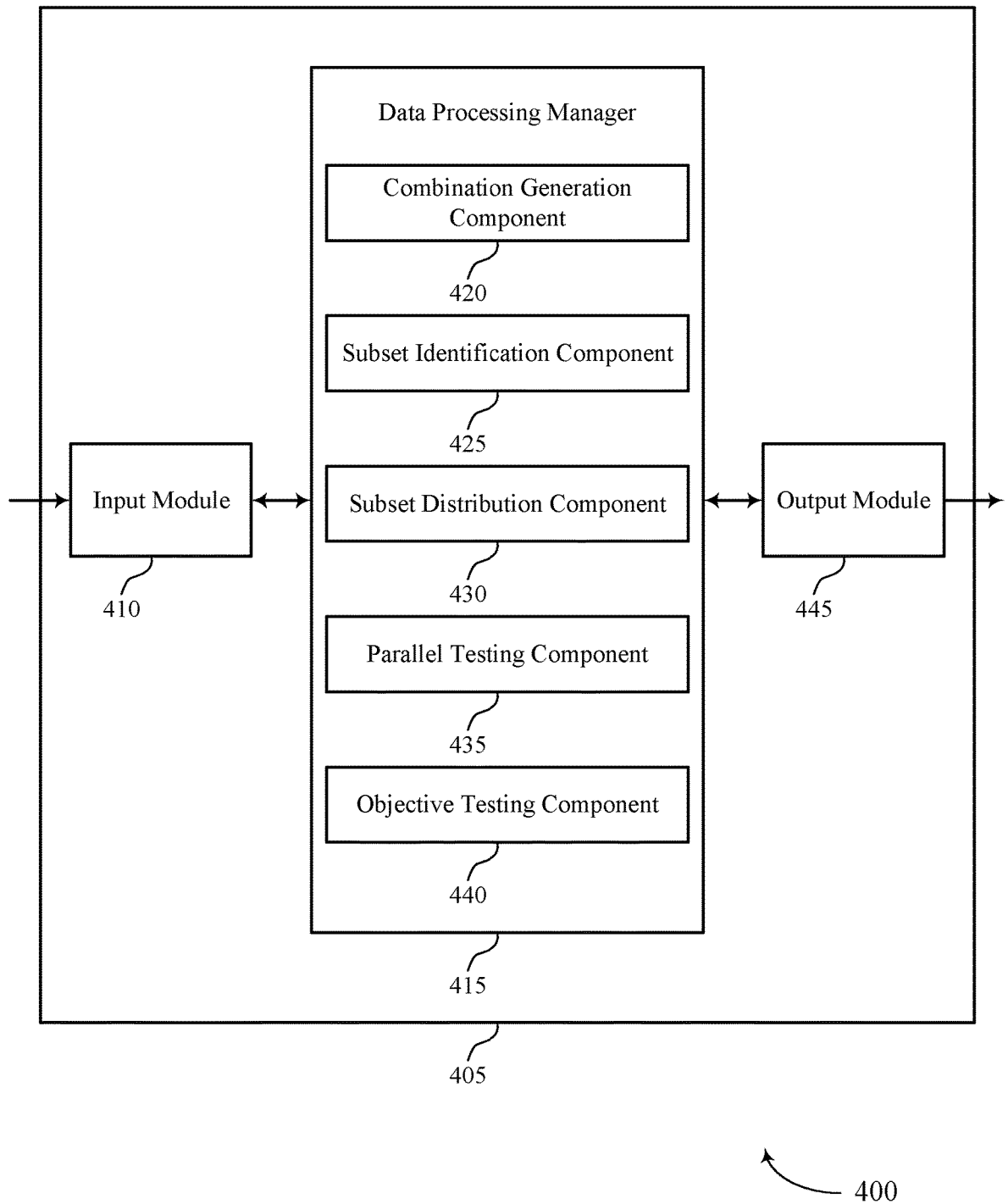
FIG. 4 shows a block diagram of an apparatus that supports distributed hyperparameter tuning and load balancing for mathematical models in accordance with aspects of the present disclosure.

FIG. 4 shows a block diagram 400 of an apparatus 405 that supports distributed hyperparameter tuning and load balancing for mathematical models in accordance with aspects of the present disclosure. The apparatus 405 may include an input module 410, a data processing manager 415, and an output module 445. The apparatus 405 may also include a processor. Each of these components may be in communication with one another (e.g., via one or more buses). In some cases, the apparatus 405 may be an example of a user terminal, a database server, or a system containing multiple computing devices.

The input module 410 may manage input signals for the apparatus 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the apparatus 405 for processing. For example, the input module 410 may transmit input signals to the data retention module 415 to support data retention handling for data object stores. In some cases, the input module 410 may be a component of an input/output (I/O) controller 615 as described with reference to FIG. 6.

The data processing manager 415 may include a combination generation component 420, a subset identification component 425, a subset distribution component 430, a parallel testing component 435, and an objective testing component 440. The data processing manager 415 may be an example of aspects of the data processing manager 505 or 610 described with reference to FIGS. 5 and 6.

The data processing manager 415 and/or at least some of its various sub-components may be implemented in hardware, software executed by a processor, firmware, or any combination thereof. If implemented in software executed by a processor, the functions of the data processing manager 415 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The data processing manager 415 and/or at least some of its various sub-components may be physically located at various positions, including being distributed such that portions of functions are implemented at different physical locations by one or more physical devices. In some examples, the data processing manager 415 and/or at least some of its various sub-components may be a separate and distinct component in accordance with various aspects of the present disclosure. In other examples, the data processing manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The combination generation component 420 may generate a first set of combinations of hyperparameter values associated with training a mathematical model. The subset identification component 425 may identify a subset of combinations from the first set of combinations that are associated with a computational runtime that exceeds a first threshold. The subset distribution component 430 may distribute the subset of combinations across a set of machines such that each machine of the set of machines is assigned a number of the subset of combinations that is less than a second threshold.

The parallel testing component 435 may test each of the first set of combinations against the mathematical model using the set of machines in a parallel processing operation to generate a first set of validation error values. The objective testing component 440 may test a second set of combinations of hyperparameter values against the mathematical model using an objective function that is based on the first set of validation error values.

The output module 445 may manage output signals for the apparatus 405. For example, the output module 445 may receive signals from other components of the apparatus 405, such as the data retention module 415, and may transmit these signals to other components or devices. In some specific examples, the output module 445 may transmit output signals for display in a user interface, for storage in a database or data store, for further processing at a server or server cluster, or for any other processes at any number of devices or systems. In some cases, the output module 445 may be a component of an I/O controller 615 as described with reference to FIG. 6.

Figure 5:
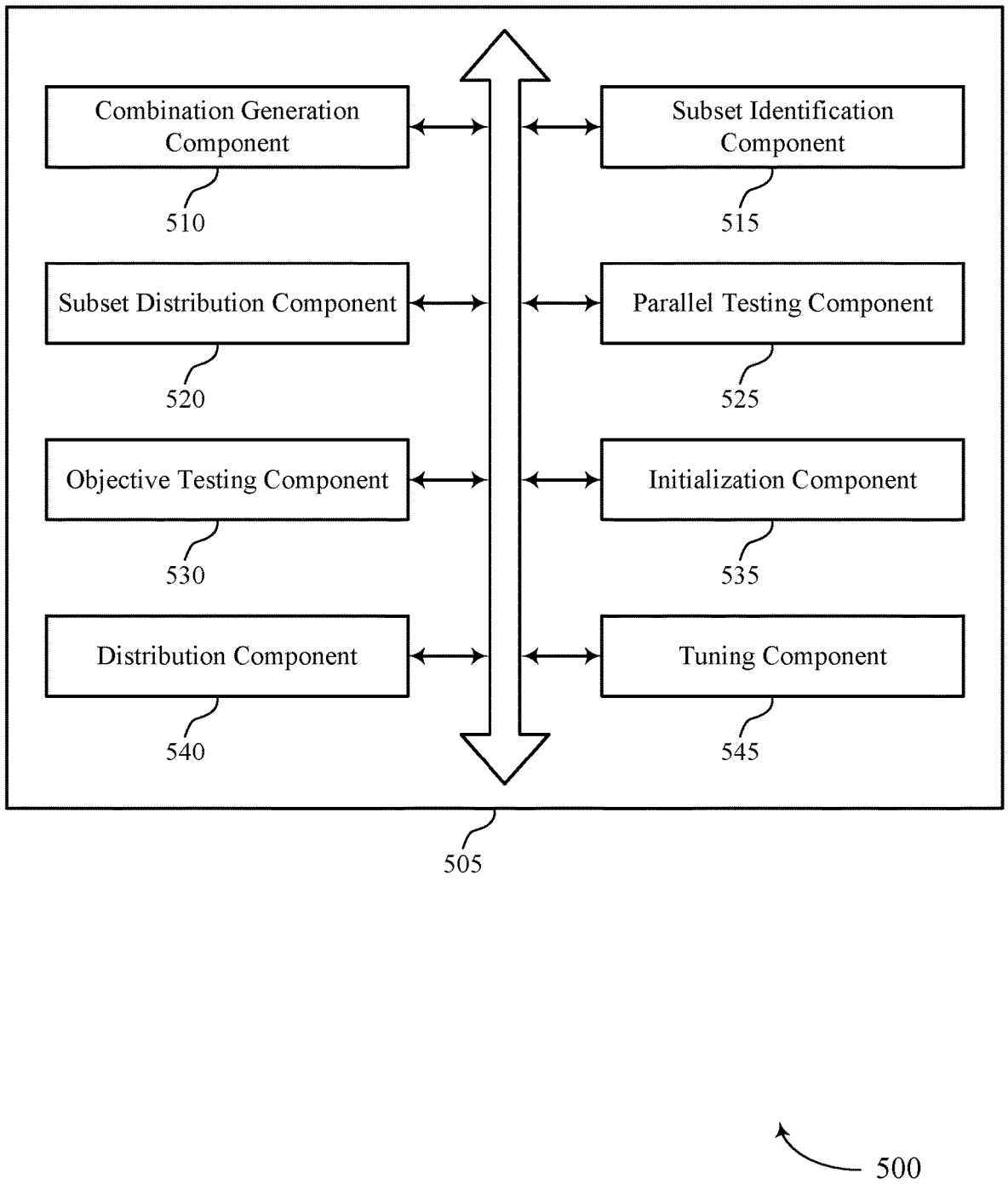
FIG. 5 shows a block diagram of a data processing manager that supports distributed hyperparameter tuning and load balancing for mathematical models in accordance with aspects of the present disclosure.

FIG. 5 shows a block diagram 500 of a data processing manager 505 that supports distributed hyperparameter tuning and load balancing for mathematical models in accordance with aspects of the present disclosure. The data processing manager 505 may be an example of aspects of a data processing manager 415 or a data processing manager 610 described herein. The data processing manager 505 may include a combination generation component 510, a subset identification component 515, a subset distribution component 520, a parallel testing component 525, an objective testing component 530, an initialization component 535, a distribution component 540, and a tuning component 545. Each of these modules may communicate, directly or indirectly, with one another (e.g., via one or more buses).

The combination generation component 510 may generate a first set of combinations of hyperparameter values associated with training a mathematical model. In some examples, the mathematical model may include a machine learning model, an optimization model, or a combination thereof.

The subset identification component 515 may identify a subset of combinations from the first set of combinations that are associated with a computational runtime that exceeds a first threshold. In some examples, the first threshold may be based on a prior experience associated with the one or more hyperparameter values, an inference from previous runs, a known benchmark, or a combination thereof.

The subset distribution component 520 may distribute the subset of combinations across a set of machines such that each machine of the set of machines is assigned a number of the subset of combinations that is less than a second threshold. In some cases, the set of machines includes servers, virtual machines, bare metal machines, a set of threads on a single multi-thread processor, or a combination thereof.

The parallel testing component 525 may test each of the first set of combinations against the mathematical model using the set of machines in a parallel processing operation to generate a first set of validation error values. The objective testing component 530 may test a second set of combinations of hyperparameter values against the mathematical model using an objective function that is based on the first set of validation error values.

In some examples, the objective testing component 530 may run the objective function using a serial processing operation. In some cases, the objective function includes a Bayesian optimization function.

In some examples, the combination generation component 510 may identify the second set of combinations of hyperparameter values based on the objective function. In some examples, the subset identification component 515 may identify one or more hyperparameter values associated with a hyperparameter, where the one or more hyperparameter values are associated with the computational runtime that exceeds the first threshold.

The distribution component 540 may distribute a remaining subset of combinations of hyperparameter values from the first set of combinations of hyperparameter values across the set of machines based on a random distribution.

The initialization component 535 may initialize the objective function based on the first set of validation error values. The tuning component 545 may tune the first threshold based on a number of the set of machines.

In some cases, the first set of combinations of hyperparameter values and the second set of combinations of hyperparameter values are different. In some cases, the first set of combinations of hyperparameter values are defined by a user and include one or more hyperparameter values associated with a set of hyperparameters. In some cases, the computational runtime is based on a runtime for one of the set of machines.

Figure 6:
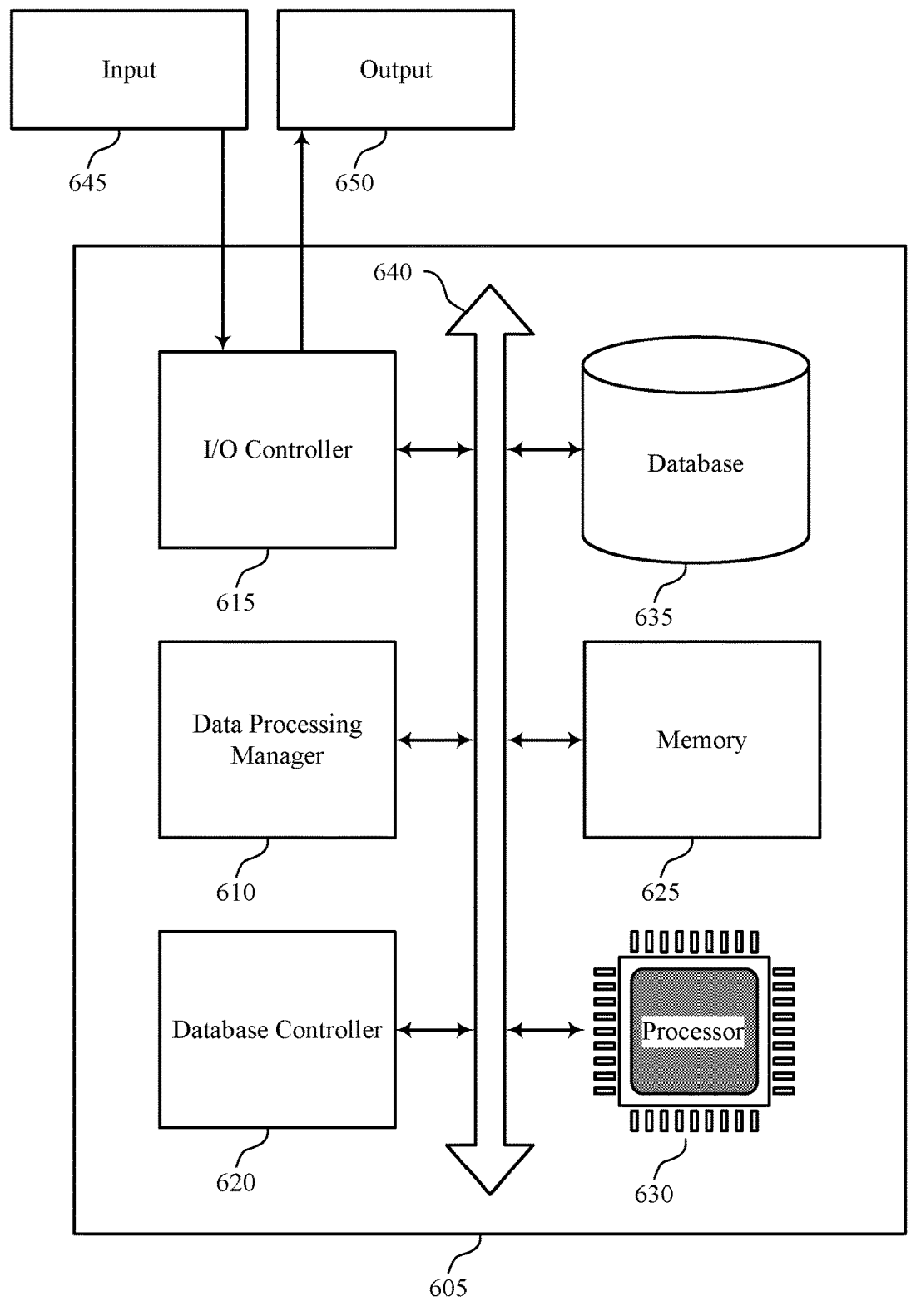
FIG. 6 shows a diagram of a system including a device that supports distributed hyperparameter tuning and load balancing for mathematical models in accordance with aspects of the present disclosure.

FIG. 6 shows a diagram of a system 600 including a device 605 that supports distributed hyperparameter tuning and load balancing for mathematical models in accordance with aspects of the present disclosure. The device 605 may be an example of or include the components of an application server or an apparatus 405 as described herein. The device 605 may include components for bi-directional data communications including components for transmitting and receiving communications, including a data processing manager 610, an I/O controller 615, a database controller 620, memory 625, a processor 630, and a database 635. These components may be in electronic communication via one or more buses (e.g., bus 640).

The data processing manager 610 may be an example of a data processing manager 415 or 505 as described herein. For example, the data processing manager 610 may perform any of the methods or processes described above with reference to FIGS. 4 and 5. In some cases, the data processing manager 610 may be implemented in hardware, software executed by a processor, firmware, or any combination thereof.

The I/O controller 615 may manage input signals 645 and output signals 650 for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The database controller 620 may manage data storage and processing in a database 635. In some cases, a user may interact with the database controller 620. In other cases, the database controller 620 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause the processor to perform various functions described herein. In some cases, the memory 625 may contain, among other things, a basic input/output system (BIOS) which may control basic hardware or software operation such as the interaction with peripheral components or devices.

The processor 630 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting distributed hyperparameter tuning and load balancing for mathematical models).

Figure 7:
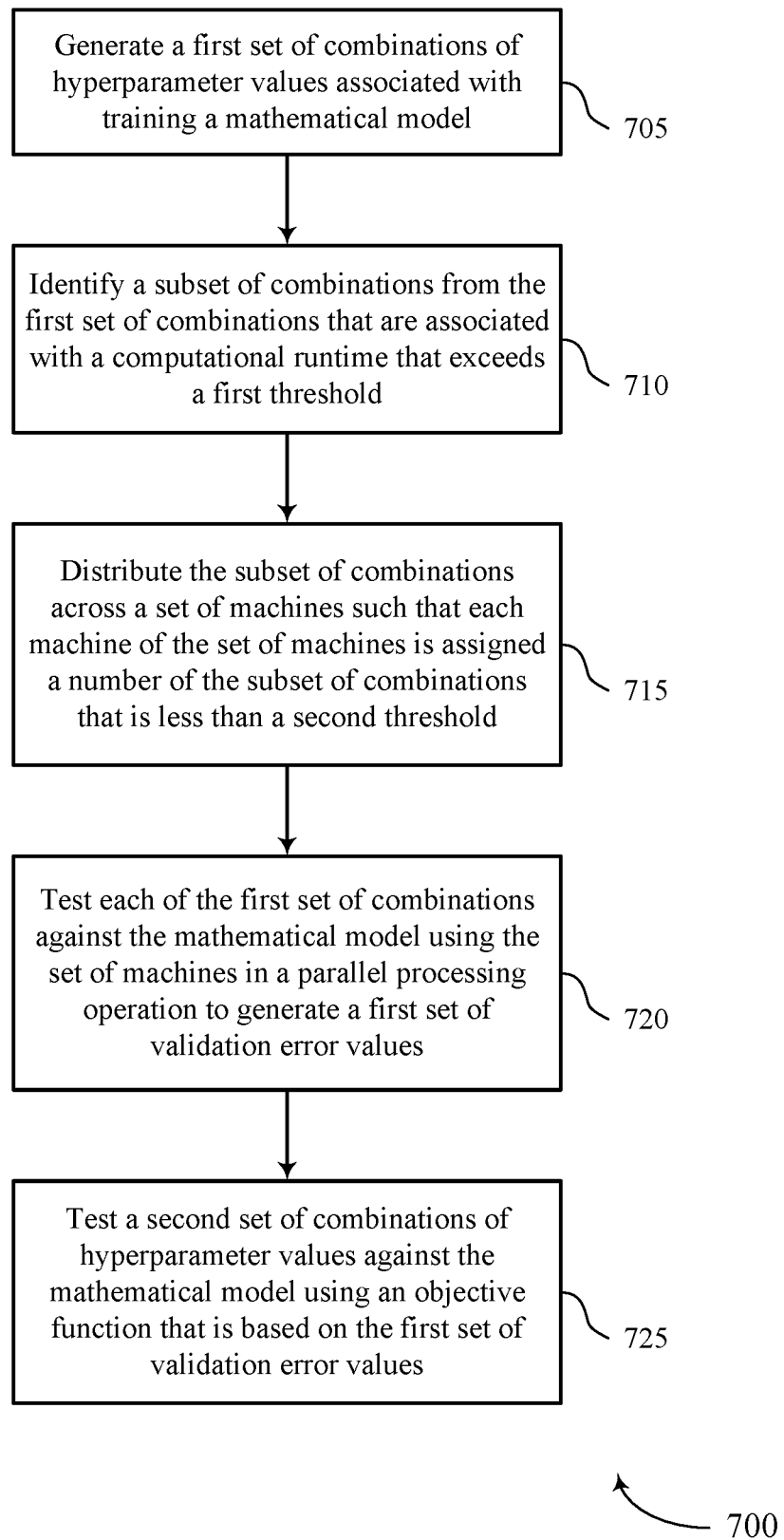
FIGS. 7 through 10 show flowcharts illustrating methods that support distributed hyperparameter tuning and load balancing for mathematical models in accordance with aspects of the present disclosure.

FIG. 7 shows a flowchart illustrating a method 700 that supports distributed hyperparameter tuning and load balancing for mathematical models in accordance with aspects of the present disclosure. The operations of method 700 may be implemented by an application server or its components as described herein. For example, the operations of method 700 may be performed by a data processing manager as described with reference to FIGS. 4 through 6. In some examples, an application server may execute a set of instructions to control the functional elements of the application server to perform the functions described below. Additionally or alternatively, an application server may perform aspects of the functions described below using special-purpose hardware.

At 705, the application server may generate a first set of combinations of hyperparameter values associated with training a mathematical model. The operations of 705 may be performed according to the methods described herein. In some examples, aspects of the operations of 705 may be performed by a combination generation component as described with reference to FIGS. 4 through 6.

At 710, the application server may identify a subset of combinations from the first set of combinations that are associated with a computational runtime that exceeds a first threshold. The operations of 710 may be performed according to the methods described herein. In some examples, aspects of the operations of 710 may be performed by a subset identification component as described with reference to FIGS. 4 through 6.

At 715, the application server may distribute the subset of combinations across a set of machines such that each machine of the set of machines is assigned a number of the subset of combinations that is less than a second threshold. The operations of 715 may be performed according to the methods described herein. In some examples, aspects of the operations of 715 may be performed by a subset distribution component as described with reference to FIGS. 4 through 6.

At 720, the application server may test each of the first set of combinations against the mathematical model using the set of machines in a parallel processing operation to generate a first set of validation error values. The operations of 720 may be performed according to the methods described herein. In some examples, aspects of the operations of 720 may be performed by a parallel testing component as described with reference to FIGS. 4 through 6.

At 725, the application server may test a second set of combinations of hyperparameter values against the mathematical model using an objective function that is based on the first set of validation error values. The operations of 725 may be performed according to the methods described herein. In some examples, aspects of the operations of 725 may be performed by an objective testing component as described with reference to FIGS. 4 through 6.

Figure 8:
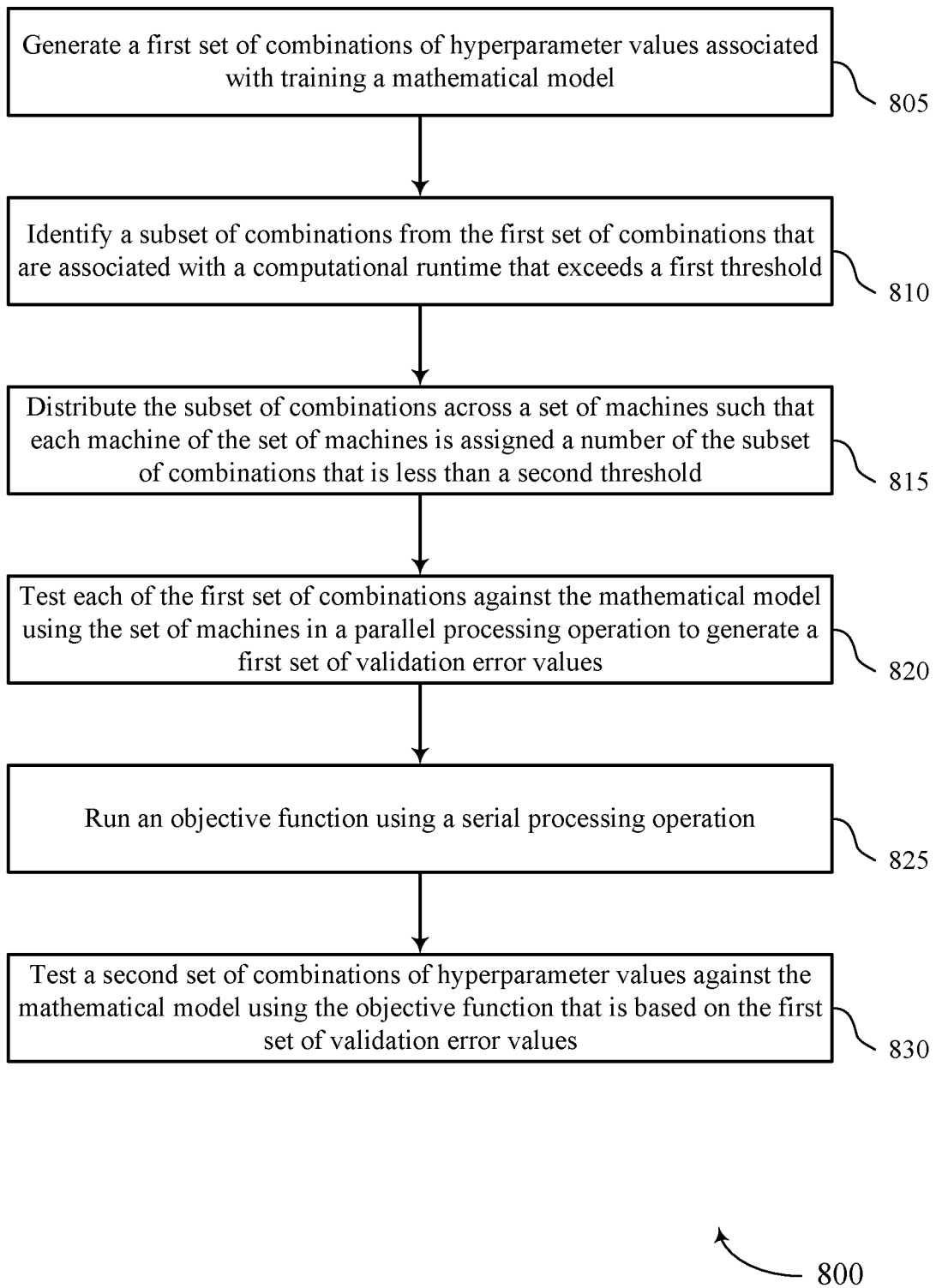

FIG. 8 shows a flowchart illustrating a method 800 that supports distributed hyperparameter tuning and load balancing for mathematical models in accordance with aspects of the present disclosure. The operations of method 800 may be implemented by an application server or its components as described herein. For example, the operations of method 800 may be performed by a data processing manager as described with reference to FIGS. 4 through 6. In some examples, an application server may execute a set of instructions to control the functional elements of the application server to perform the functions described below. Additionally or alternatively, an application server may perform aspects of the functions described below using special-purpose hardware.

At 805, the application server may generate a first set of combinations of hyperparameter values associated with training a mathematical model. The operations of 805 may be performed according to the methods described herein. In some examples, aspects of the operations of 805 may be performed by a combination generation component as described with reference to FIGS. 4 through 6.

At 810, the application server may identify a subset of combinations from the first set of combinations that are associated with a computational runtime that exceeds a first threshold. The operations of 810 may be performed according to the methods described herein. In some examples, aspects of the operations of 810 may be performed by a subset identification component as described with reference to FIGS. 4 through 6.

At 815, the application server may distribute the subset of combinations across a set of machines such that each machine of the set of machines is assigned a number of the subset of combinations that is less than a second threshold. The operations of 815 may be performed according to the methods described herein. In some examples, aspects of the operations of 815 may be performed by a subset distribution component as described with reference to FIGS. 4 through 6.

At 820, the application server may test each of the first set of combinations against the mathematical model using the set of machines in a parallel processing operation to generate a first set of validation error values. The operations of 820 may be performed according to the methods described herein. In some examples, aspects of the operations of 820 may be performed by a parallel testing component as described with reference to FIGS. 4 through 6.

At 825, the application server may run an objective function using a serial processing operation. The operations of 825 may be performed according to the methods described herein. In some examples, aspects of the operations of 825 may be performed by an objective testing component as described with reference to FIGS. 4 through 6.

At 830, the application server may test a second set of combinations of hyperparameter values against the mathematical model using the objective function that is based on the first set of validation error values. The operations of 830 may be performed according to the methods described herein. In some examples, aspects of the operations of 830 may be performed by an objective testing component as described with reference to FIGS. 4 through 6.

Figure 9:
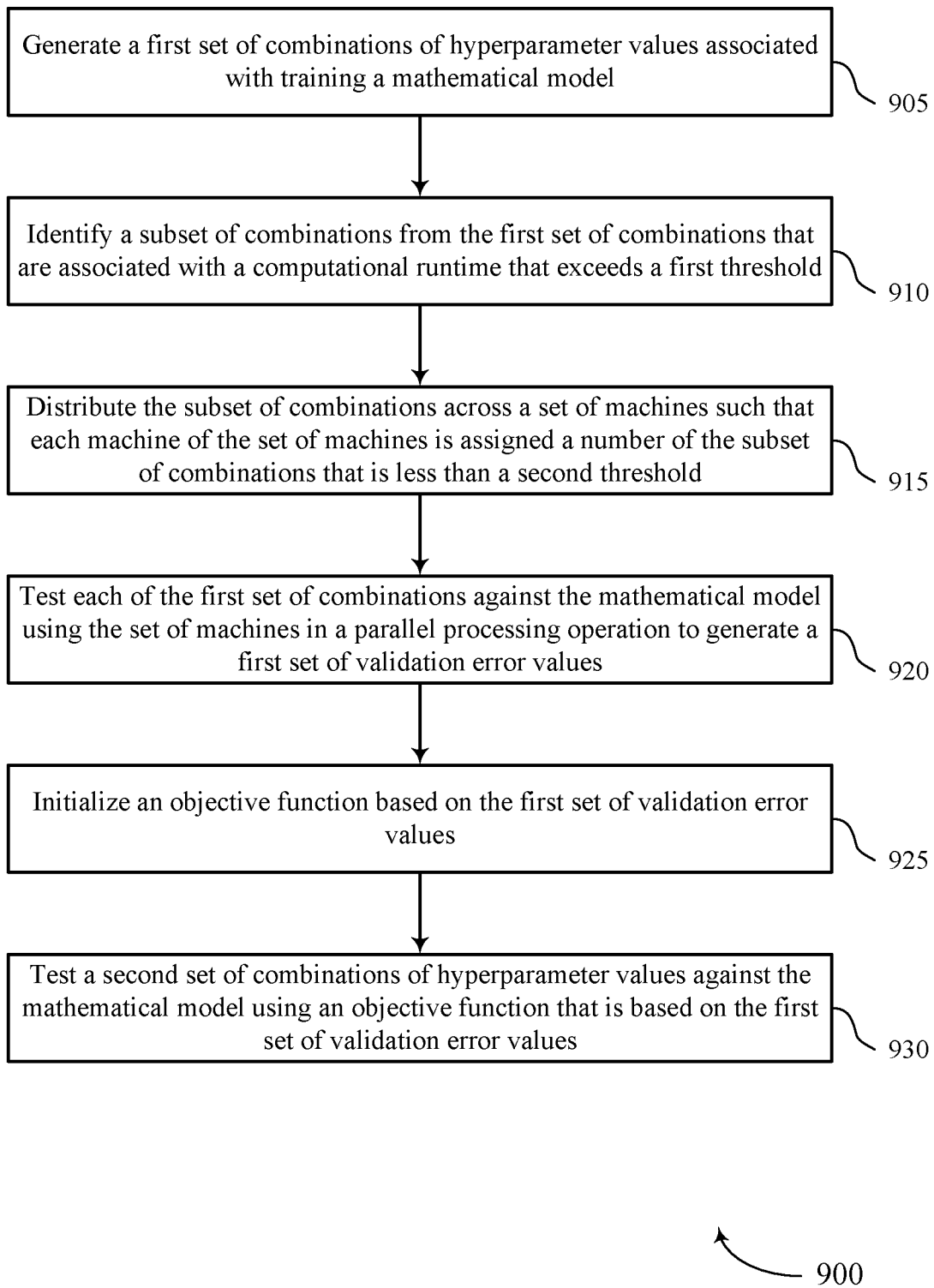

FIG. 9 shows a flowchart illustrating a method 900 that supports distributed hyperparameter tuning and load balancing for mathematical models in accordance with aspects of the present disclosure. The operations of method 900 may be implemented by an application server or its components as described herein. For example, the operations of method 900 may be performed by a data processing manager as described with reference to FIGS. 4 through 6. In some examples, an application server may execute a set of instructions to control the functional elements of the application server to perform the functions described below. Additionally or alternatively, an application server may perform aspects of the functions described below using special-purpose hardware.

At 905, the application server may generate a first set of combinations of hyperparameter values associated with training a mathematical model. The operations of 905 may be performed according to the methods described herein. In some examples, aspects of the operations of 905 may be performed by a combination generation component as described with reference to FIGS. 4 through 6.

At 910, the application server may identify a subset of combinations from the first set of combinations that are associated with a computational runtime that exceeds a first threshold. The operations of 910 may be performed according to the methods described herein. In some examples, aspects of the operations of 910 may be performed by a subset identification component as described with reference to FIGS. 4 through 6.

At 915, the application server may distribute the subset of combinations across a set of machines such that each machine of the set of machines is assigned a number of the subset of combinations that is less than a second threshold. The operations of 915 may be performed according to the methods described herein. In some examples, aspects of the operations of 915 may be performed by a subset distribution component as described with reference to FIGS. 4 through 6.

At 920, the application server may test each of the first set of combinations against the mathematical model using the set of machines in a parallel processing operation to generate a first set of validation error values. The operations of 920 may be performed according to the methods described herein. In some examples, aspects of the operations of 920 may be performed by a parallel testing component as described with reference to FIGS. 4 through 6.

At 925, the application server may initialize the objective function based on the first set of validation error values. The operations of 925 may be performed according to the methods described herein. In some examples, aspects of the operations of 925 may be performed by an initialization component as described with reference to FIGS. 4 through 6.

At 930, the application server may test a second set of combinations of hyperparameter values against the mathematical model using an objective function that is based on the first set of validation error values. The operations of 930 may be performed according to the methods described herein. In some examples, aspects of the operations of 930 may be performed by an objective testing component as described with reference to FIGS. 4 through 6.

Figure 10:
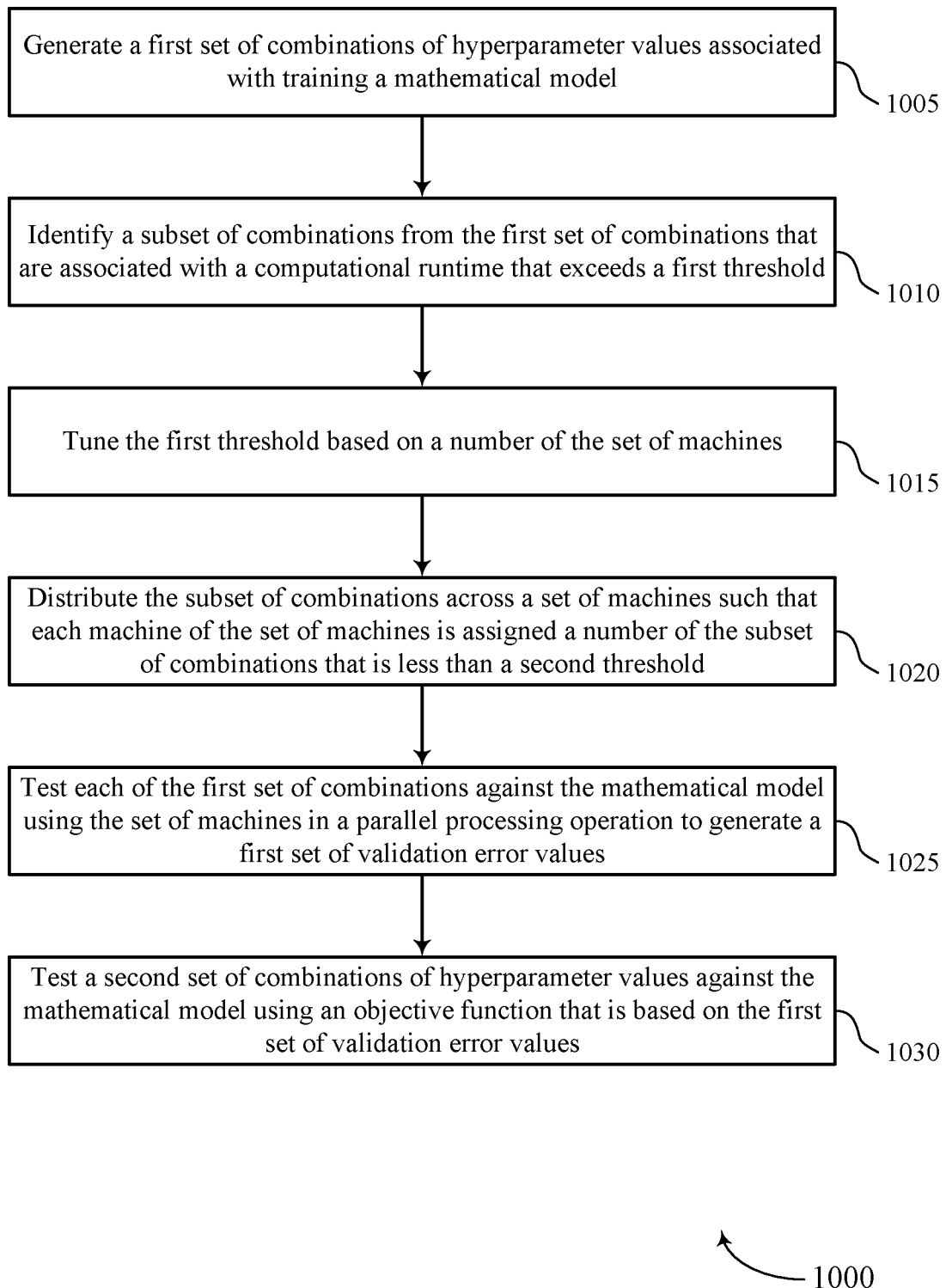

FIG. 10 shows a flowchart illustrating a method 1000 that supports distributed hyperparameter tuning and load balancing for mathematical models in accordance with aspects of the present disclosure. The operations of method 1000 may be implemented by an application server or its components as described herein. For example, the operations of method 1000 may be performed by a data processing manager as described with reference to FIGS. 4 through 6. In some examples, an application server may execute a set of instructions to control the functional elements of the application server to perform the functions described below. Additionally or alternatively, an application server may perform aspects of the functions described below using special-purpose hardware.

At 1005, the application server may generate a first set of combinations of hyperparameter values associated with training a mathematical model. The operations of 1005 may be performed according to the methods described herein. In some examples, aspects of the operations of 1005 may be performed by a combination generation component as described with reference to FIGS. 4 through 6.

At 1010, the application server may identify a subset of combinations from the first set of combinations that are associated with a computational runtime that exceeds a first threshold. The operations of 1010 may be performed according to the methods described herein. In some examples, aspects of the operations of 1010 may be performed by a subset identification component as described with reference to FIGS. 4 through 6.

At 1015, the application server may tune the first threshold based on a number of the set of machines. The operations of 1015 may be performed according to the methods described herein. In some examples, aspects of the operations of 1015 may be performed by a tuning component as described with reference to FIGS. 4 through 6.

At 1020, the application server may distribute the subset of combinations across a set of machines such that each machine of the set of machines is assigned a number of the subset of combinations that is less than a second threshold. The operations of 1020 may be performed according to the methods described herein. In some examples, aspects of the operations of 1020 may be performed by a subset distribution component as described with reference to FIGS. 4 through 6.

At 1025, the application server may test each of the first set of combinations against the mathematical model using the set of machines in a parallel processing operation to generate a first set of validation error values. The operations of 1025 may be performed according to the methods described herein. In some examples, aspects of the operations of 1025 may be performed by a parallel testing component as described with reference to FIGS. 4 through 6.

At 1030, the application server may test a second set of combinations of hyperparameter values against the mathematical model using an objective function that is based on the first set of validation error values. The operations of 1030 may be performed according to the methods described herein. In some examples, aspects of the operations of 1030 may be performed by an objective testing component as described with reference to FIGS. 4 through 6.

A method of data processing is described. The method may include generating a first set of combinations of hyperparameter values associated with training a mathematical model, identifying a subset of combinations from the first set of combinations that are associated with a computational runtime that exceeds a first threshold, distributing the subset of combinations across a set of machines such that each machine of the set of machines is assigned a number of the subset of combinations that is less than a second threshold, testing each of the first set of combinations against the mathematical model using the set of machines in a parallel processing operation to generate a first set of validation error values, and testing a second set of combinations of hyperparameter values against the mathematical model using an objective function that is based on the first set of validation error values.

An apparatus for data processing is described. The apparatus may include a processor, memory coupled with the processor, and instructions stored in the memory. The instructions may be executable by the processor to cause the apparatus to generate a first set of combinations of hyperparameter values associated with training a mathematical model, identify a subset of combinations from the first set of combinations that are associated with a computational runtime that exceeds a first threshold, distribute the subset of combinations across a set of machines such that each machine of the set of machines is assigned a number of the subset of combinations that is less than a second threshold, test each of the first set of combinations against the mathematical model using the set of machines in a parallel processing operation to generate a first set of validation error values, and test a second set of combinations of hyperparameter values against the mathematical model using an objective function that is based on the first set of validation error values.

Another apparatus for data processing is described. The apparatus may include means for generating a first set of combinations of hyperparameter values associated with training a mathematical model, identifying a subset of combinations from the first set of combinations that are associated with a computational runtime that exceeds a first threshold, distributing the subset of combinations across a set of machines such that each machine of the set of machines is assigned a number of the subset of combinations that is less than a second threshold, testing each of the first set of combinations against the mathematical model using the set of machines in a parallel processing operation to generate a first set of validation error values, and testing a second set of combinations of hyperparameter values against the mathematical model using an objective function that is based on the first set of validation error values.

A non-transitory computer-readable medium storing code for data processing is described. The code may include instructions executable by a processor to generate a first set of combinations of hyperparameter values associated with training a mathematical model, identify a subset of combinations from the first set of combinations that are associated with a computational runtime that exceeds a first threshold, distribute the subset of combinations across a set of machines such that each machine of the set of machines is assigned a number of the subset of combinations that is less than a second threshold, test each of the first set of combinations against the mathematical model using the set of machines in a parallel processing operation to generate a first set of validation error values, and test a second set of combinations of hyperparameter values against the mathematical model using an objective function that is based on the first set of validation error values.

In some examples of the method, apparatuses, and non-transitory computer-readable medium described herein, testing the second set of combinations of hyperparameter values may include operations, features, means, or instructions for running the objective function using a serial processing operation.

Some examples of the method, apparatuses, and non-transitory computer-readable medium described herein may further include operations, features, means, or instructions for identifying the second set of combinations of hyperparameter values based on the objective function.

Some examples of the method, apparatuses, and non-transitory computer-readable medium described herein may further include operations, features, means, or instructions for initializing the objective function based on the first set of validation error values.

In some examples of the method, apparatuses, and non-transitory computer-readable medium described herein, identifying the subset of combinations from the first set of combinations may include operations, features, means, or instructions for identifying one or more hyperparameter values associated with a hyperparameter, where the one or more hyperparameter values may be associated with the computational runtime that exceeds the first threshold.

Some examples of the method, apparatuses, and non-transitory computer-readable medium described herein may further include operations, features, means, or instructions for distributing a remaining subset of combinations of hyperparameter values from the first set of combinations of hyperparameter values across the set of machines based on a random distribution.

Some examples of the method, apparatuses, and non-transitory computer-readable medium described herein may further include operations, features, means, or instructions for tuning the first threshold based on a number of the set of machines.

In some examples of the method, apparatuses, and non-transitory computer-readable medium described herein, the first threshold is based on a prior experience associated with the one or more hyperparameter values, an inference from previous runs, a known benchmark, or a combination thereof.

In some examples of the method, apparatuses, and non-transitory computer-readable medium described herein, the objective function includes a Bayesian optimization function.

In some examples of the method, apparatuses, and non-transitory computer-readable medium described herein, the computational runtime may be based on a runtime for one of the set of machines.

In some examples of the method, apparatuses, and non-transitory computer-readable medium described herein, the first set of combinations of hyperparameter values and the second set of combinations of hyperparameter values may be different.

In some examples of the method, apparatuses, and non-transitory computer-readable medium described herein, the first set of combinations of hyperparameter values may be defined by a user and include one or more hyperparameter values associated with a set of hyperparameters.

In some examples of the method, apparatuses, and non-transitory computer-readable medium described herein, the set of machines includes servers, virtual machines, bare metal machines, a set of threads on a single multi-thread processor, or a combination thereof.

In some examples of the method, apparatuses, and non-transitory computer-readable medium described herein, the mathematical model includes a machine learning model, an optimization model, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these.

Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for training a mathematical model associated with a plurality of hyperparameter values via a serial process, comprising:

generating a first plurality of combinations of hyperparameter values from the plurality of hyperparameter values associated with training the mathematical model;

identifying a subset of combinations of hyperparameter values from the first plurality of combinations of hyperparameter values, wherein one or more combinations of hyperparameter values of the subset of combinations of hyperparameter values are associated with a computational runtime that exceeds a first threshold that is a computational runtime threshold associated with a computational runtime value;

distributing combinations of hyperparameter values from the subset of combinations of hyperparameter values to be executed on a plurality of machines such that each machine of the plurality of machines is assigned a number combinations of hyperparameter values from of the subset of combinations of hyperparameter values that is less than a second threshold, wherein the second threshold is a threshold number of combinations of hyperparameter values from the subset of combinations of hyperparameter values;

testing each of the first plurality of combinations of hyperparameter values against the mathematical model using the plurality of machines in a parallel processing operation to generate a first plurality of validation error values, one or more validation error values of the first plurality of validation error values corresponding to the testing of one or more combinations of hyperparameter values of the first plurality of combinations of hyperparameter values against the mathematical model, wherein the parallel processing operation is operated in accordance with the distributed combinations of hyperparameter values from the subset of combinations of hyperparameter values, and wherein the testing of the first plurality of combinations of hyperparameter values against the mathematical model is a first part of the serial process; and testing a second plurality of combinations of hyperparameter values against the mathematical model using an objective function, an input of the objective function being based at least in part on the first plurality of validation error values and the objective function generating a result value including combinations of hyperparameter values for training the mathematical model based at least in part on the input of the objective function, wherein the testing of the second plurality of combinations of hyperparameter values against the mathematical model is a second part of the serial process and is based at least in part on the first part of the serial process, wherein the result value is a result of the serial process such that the combinations of hyperparameter values included in the result value are associated with validation error values that are less than a validation error value threshold, and wherein the result value is generated is based at least in part on the combinations of hyperparameter values from the subset of combinations of hyperparameter values being distributed on the plurality of machines.

2. The method of claim 1, wherein testing the second plurality of combinations of hyperparameter values comprises:
running the objective function using the serial process.

3. The method of claim 1, further comprising:
identifying the second plurality of combinations of hyperparameter values based at least in part on the objective function.

4. The method of claim 1, further comprising:
initializing the objective function based at least in part on the first plurality of validation error values.

5. The method of claim 1, wherein identifying the subset of combinations from the first plurality of combinations comprises:
identifying one or more hyperparameter values associated with a hyperparameter, wherein the one or more hyperparameter values are associated with the computational runtime that exceeds the first threshold.

6. The method of claim 5, wherein the first threshold is based at least in part on a prior experience associated with the one or more hyperparameter values, an inference from previous runs, a known benchmark, or a combination thereof.

7. The method of claim 1, further comprising:
distributing combinations of hyperparameter values from a remaining subset of combinations of hyperparameter values from the first plurality of combinations of hyperparameter values across the plurality of machines based at least in part on a random distribution.

8. The method of claim 1, further comprising:
tuning the first threshold based at least in part on a number of the plurality of machines.

9. The method of claim 1, wherein the objective function comprises a Bayesian optimization function.

10. The method of claim 1, wherein the computational runtime is based at least in part on a runtime for one of the plurality of machines.

11. The method of claim 1, wherein the first plurality of combinations of hyperparameter values and the second plurality of combinations of hyperparameter values are different.

12. The method of claim 1, wherein the first plurality of combinations of hyperparameter values are defined by a user and comprise one or more hyperparameter values associated with the plurality of hyperparameter values.

13. The method of claim 1, wherein the plurality of machines comprises servers, virtual machines, bare metal machines, a plurality of threads on a single multi-thread processor, or a combination thereof.

14. The method of claim 1, wherein the mathematical model comprises a machine learning model, an optimization model, or a combination thereof.

15. An apparatus for training a mathematical model associated with a plurality of hyperparameter values via a serial process, comprising:
a processor,
memory coupled with the processor; and
instructions stored in the memory and executable by the processor to cause the apparatus to:
generate a first plurality of combinations of hyperparameter values from the plurality of hyperparameter values associated with training the mathematical model;
identify a subset of combinations of hyperparameter values from the first plurality of combinations of hyperparameter values, wherein one or more combinations of hyperparameter values of the subset of combinations of hyperparameter values are associated with a computational runtime that exceeds a first threshold that is a computational runtime threshold associated with a computational runtime value;
distribute combinations of hyperparameter values from the subset of combinations of hyperparameter values to be executed on a plurality of machines such that each machine of the plurality of machines is assigned a number of combinations of hyperparameter values from the subset of combinations of hyperparameter values that is less than a second threshold, wherein the second threshold is a threshold number of combinations of hyperparameter values from the subset of combinations of hyperparameter values;
test each of the first plurality of combinations of hyperparameter values against the mathematical model using the plurality of machines in a parallel processing operation to generate a first plurality of validation error values, one or more validation error values of the first plurality of validation error values corresponding to the testing of one or more combinations of hyperparameter values of the first plurality of combinations of hyperparameter values against the mathematical model, wherein the parallel processing operation is operated in accordance with the distributed combinations of hyperparameter values from the subset of combinations of hyperparameter values, and wherein the testing of the first plurality of combinations of hyperparameter values against the mathematical model is a first part of the serial process; and
test a second plurality of combinations of hyperparameter values against the mathematical model using an objective function, an input of the objective function being based at least in part on the first plurality of validation error values and the objective function generating a result value including combinations of hyperparameter values for training the mathematical model based at least in part on the input of the objective function, wherein the testing of the second plurality of combinations of hyperparameter values against the mathematical model is a second part of the serial process and is based at least in part on the first part of the serial process, wherein the result value is a result of the serial process such that the combinations of hyperparameter values included in the result value are associated with validation error values that are less than a validation error value threshold, and wherein the result value is generated is based at least in part on the combinations of hyperparameter values from the subset of combinations of hyperparameter values being distributed on the plurality of machines.

16. The apparatus of claim 15, wherein the instructions to test the second plurality of combinations of hyperparameter values are executable by the processor to cause the apparatus to:
run the objective function using the serial process.

17. The apparatus of claim 15, wherein the instructions are further executable by the processor to cause the apparatus to:
identify the second plurality of combinations of hyperparameter values based at least in part on the objective function.

18. The apparatus of claim 15, wherein the instructions are further executable by the processor to cause the apparatus to:

initialize the objective function based at least in part on the first plurality of validation error values.

19. The apparatus of claim 15, wherein the instructions to identify the subset of combinations from the first plurality of combinations are executable by the processor to cause the apparatus to:

identify one or more hyperparameter values associated with a hyperparameter, wherein the one or more hyperparameter values are associated with the computational runtime that exceeds the first threshold.

20. A non-transitory computer-readable medium storing code for training a mathematical model associated with a plurality of hyperparameter values via a serial process, the code comprising instructions executable by a processor to:

generate a first plurality of combinations of hyperparameter values from the plurality of hyperparameter values associated with training the mathematical model;

identify a subset of combinations of hyperparameter values from the first plurality of combinations of hyperparameter values, wherein one or more combinations of hyperparameter values of the subset of combinations of hyperparameter values are associated with a computational runtime that exceeds a first threshold that is a computational runtime threshold associated with a computational runtime value;

distribute combinations of hyperparameter values from the subset of combinations of hyperparameter values to be executed on a plurality of machines such that each machine of the plurality of machines is assigned a number of combinations of hyperparameter values from the subset of combinations of hyperparameter values that is less than a second threshold, wherein the second threshold is a threshold number of combinations of hyperparameter values from the subset of combinations of hyperparameter values;

test each of the first plurality of combinations of hyperparameter values against the mathematical model using the plurality of machines in a parallel processing operation to generate a first plurality of validation error values, one or more validation error values of the first plurality of validation error values corresponding to the testing of one or more combinations of hyperparameter values of the first plurality of combinations of hyperparameter values against the mathematical model, wherein the parallel processing operation is operated in accordance with the distributed combinations of hyperparameter values from the subset of combinations of hyperparameter values, and wherein the testing of the first plurality of combinations of hyperparameter values against the mathematical model is a first part of the serial process; and test a second plurality of combinations of hyperparameter values against the mathematical model using an objective function, an input of the objective function being based at least in part on the first plurality of validation error values and the objective function generating a result value including combinations of hyperparameter values for training the mathematical model based at least in part on the input of the objective function, wherein the testing of the second plurality of combinations of hyperparameter values against the mathematical model is a second part of the serial process and is based at least in part on the first part of the serial process, wherein the result value is a result of the serial process such that the combinations of hyperparameter values included in the result value are associated with validation error values that are less than a validation error value threshold, and wherein the result value is generated is based at least in part on the combinations of hyperparameter values from the subset of combinations of hyperparameter values being distributed on the plurality of machines.

\* \* \* \* \*

UNITED STATES PATENT AND TRADEMARK OFFICE
CERTIFICATE OF CORRECTION

| | | |
|---|---|---|
| PATENT NO. | : 11,928,584 B2 | |
| APPLICATION NO. | : 16/778587 | |
| DATED | : March 12, 2024 | |
| INVENTOR(S) | : Powley et al. | |

It is certified that error appears in the above-identified patent and that said Letters Patent is hereby corrected as shown below:

On the Title Page

Item (71), Applicant:, delete "salesforce.com, inc." and add ---Salesforce, Inc.---

Signed and Sealed this
Twenty-third Day of April, 2024

*Katherine Kelly Vidal*

Katherine Kelly Vidal
*Director of the United States Patent and Trademark Office*